United States Patent
Wolff (10) Patent No.: US 6,668,271 B1
(45) Date of Patent: Dec. 23, 2003

(54) SYSTEM FOR DISTRIBUTING, INSTALLING AND RUNNING WEB APPLICATIONS (AGENTS)

(75) Inventor: Gregory Wolff, Mountain View, CA (US)

(73) Assignee: Richo Company, Ltd., Tokyo (JP)

( * ) Notice: Subject to any disclaimer, the term of this patent is extended or adjusted under 35 U.S.C. 154(b) by 0 days.

(21) Appl. No.: 09/314,614

(22) Filed: May 19, 1999

(51) Int. Cl.$^7$ ................................ G06F 15/16
(52) U.S. Cl. ............... 709/202; 709/217; 709/219; 709/224; 707/10; 707/103 Y
(58) Field of Search ............... 709/202, 224, 709/217, 219; 707/10, 103 Y (56) References Cited

U.S. PATENT DOCUMENTS

| | | | |
|---|---|---|---|
| 5,710,918 A | | 1/1998 | Lagarde et al. ............... 707/10 |
| 5,721,908 A | | 2/1998 | Lagarde et al. ............... 707/10 |
| 5,745,754 A | | 4/1998 | Lagarde et al. .......... 707/104.1 |
| 5,793,964 A | | 8/1998 | Rogers et al. ............... 709/202 |
| 5,848,413 A | * | 12/1998 | Wolff .......................... 358/448 |
| 5,991,802 A | * | 11/1999 | Allard et al. ................ 709/219 |
| 5,999,940 A | * | 12/1999 | Ranger .................... 707/103 R |
| 6,012,083 A | * | 1/2000 | Savitzky et al. ............... 707/10 |
| 6,163,794 A | * | 12/2000 | Lange et al. ................. 709/202 |
| 6,201,948 B1 | * | 3/2001 | Cook et al. .................. 434/350 |
| 6,405,245 B1 | * | 6/2002 | Burson et al. ............... 345/705 |
| 6,427,063 B1 | * | 7/2002 | Cook et al. .................. 434/350 |

* cited by examiner

Primary Examiner—Kenneth R. Coulter
Assistant Examiner—Hai V. Nguyen
(74) Attorney, Agent, or Firm—Philip H. Albert; Townsend and Townsend and Crew, LLP (57) ABSTRACT

A networked information appliance for use on a network, comprising a plurality of agency base units, wherein each base unit is configured on the network with an address and a plurality of agent cards, wherein each agent card includes state for at least one functionality that is provided to a user of the network at an address dependent on the address of the agency base unit into which the agent card is mounted.

11 Claims, 6 Drawing Sheets

```
        agent:
<agent>
        <class>CalendarAgent</class>
        <name>Calendar</name>
        <owner>joe</owner>
        <id>765</id>
        ...[other state variables]...
        <last_trans>add_Event</last_trans>
</agent>

/data/1998/07/21/03pm.html:
<event>
        <date>07/21/1998</date>
        <time>03 30pm</time>
        <description>meeting</description>
</event> agent.ts:
<tagset>
        <define element=event>
                <action>
                        <!-- how to transform events -->
                        ...
                        ...&agent:name...
                        ...
                </action>
        </define>
        <define element=show_events>
                <action>
                        find event file
                        output event file
                </action>
        </define>
</tagset> events.xml:
<h1> Today's Events </h1>
<show_events date=&date;></show_events>
<...>
<footer></footer>
```

SYSTEM FOR DISTRIBUTING, INSTALLING AND RUNNING WEB APPLICATIONS (AGENTS)

BACKGROUND OF THE INVENTION

The present invention relates generally to networking and more particularly to a system for allowing state to be transported around a network easily, reliably and intuitively.

Typically, network information appliances have to be configured for their location, including assigning each network machine its own network address and host name. Typically these devices require a configuration step performed by a system administrator to set the address and name. Automatic configuration methods that do not require a system administrator have been proposed, but they are still difficult to install and support.

SUMMARY OF THE INVENTION

One embodiment of the present invention provides a networked information appliance for use on a network, comprising a plurality of agency base units, wherein each base unit is configured on the network with an address and a plurality of agent cards, wherein each-agent card includes state for at least one set of functionality that is provided to a user of the network at an address dependent on the address of the agency base unit into which the agent card is mounted.

A further understanding of the nature and advantages of the inventions herein may be realized by reference to the remaining portions of the specification and the attached drawings.

DESCRIPTION OF THE SPECIFIC EMBODIMENTS

Figure 1:
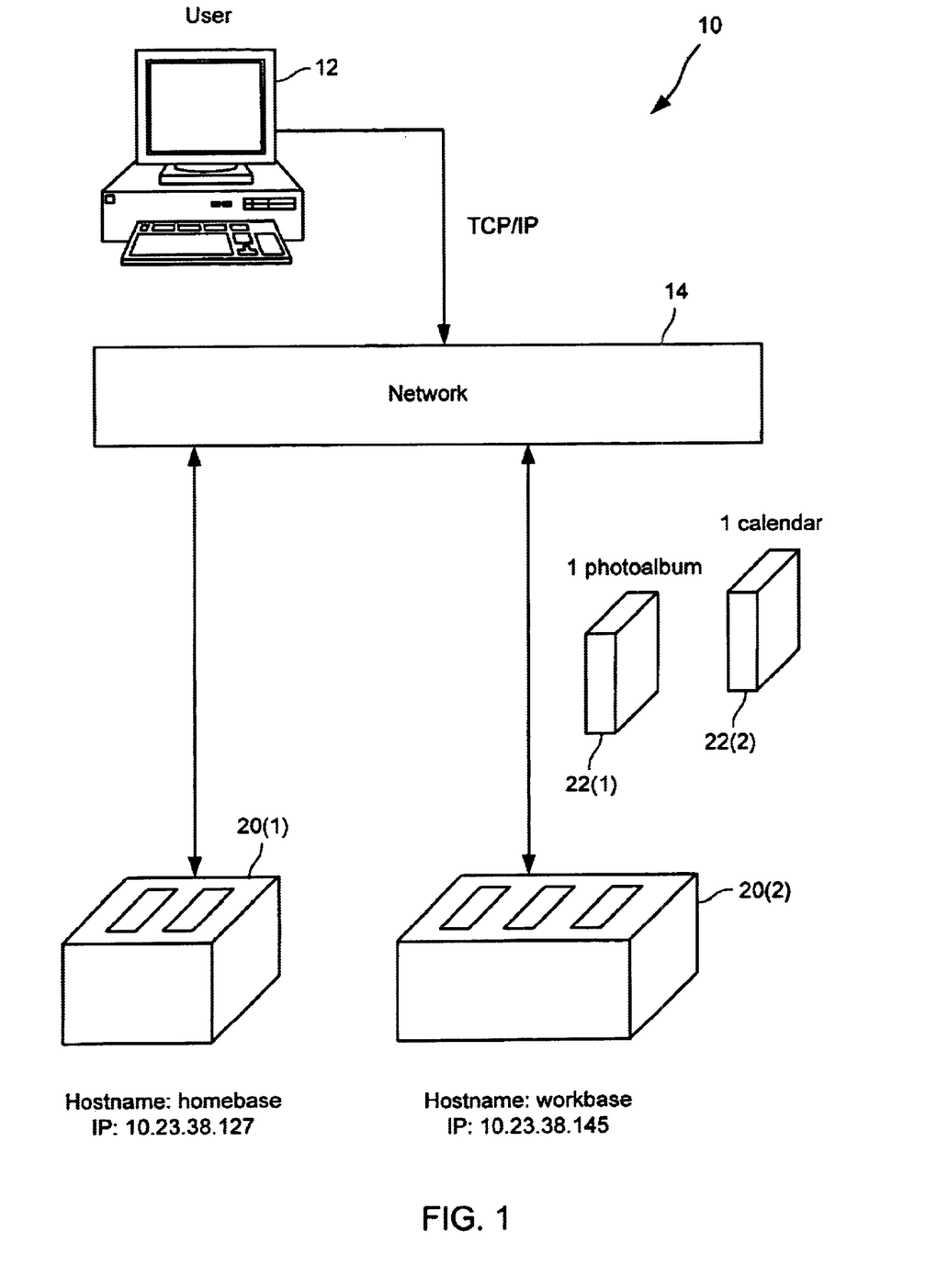
FIG. 1 is a schematic of a networked computer system according to one embodiment of the present invention, including base units that serve as agencies and portable units that serve as agents.

FIG. 1 is a schematic of a networked computer system 10 according to one embodiment of the present invention. System 10 is shown including a user computer 12, a network 14, two agency units 20 coupled to network 14, and two agent cards 22. User computer 12 is any computer, operated by a person or a computer process, which is configured to access data over a network. Network 14 might be, for example, the Internet, a well-known global internetwork of networks. If network 14 is the Internet, communications between user computer 12 and network 14 is likely to be in the form of TCP/IP (Transport Control Protocol/Internet Protocol) packet communications, but other protocols might work just as well.

With Internet communications, each addressable object on the Internet has an IP address (shown as four decimal values ranging from 0 to 255 and delimited with periods). An object with an IP address might also have a "hostname" that corresponds to the IP address. In system 10, agency unit 20(1) has an IP address of 10.23.38.127 and a hostname of "homebase", while agency unit 20(2) has an IP address of 10.23.38.145 and a hostname of "workbase". In this example, the hostnames are selected to illustrate one application of system 10, which is to allow easy portability of agents (and their associated state) between two networked locations, such as a home computer and a work computer.

The agent cards 22 are identified by pathnames, such as "/photoalbum" for agent card 22(1) and "/calendar" for agent card 22(2). As explained below, when an agent card 22 is mounted in an agency unit 20, the capabilities of the agent card are made available to user computer 12 and are addressed by a combination of the hostname of the agency unit and the pathname of the agent card.

Figure 2:
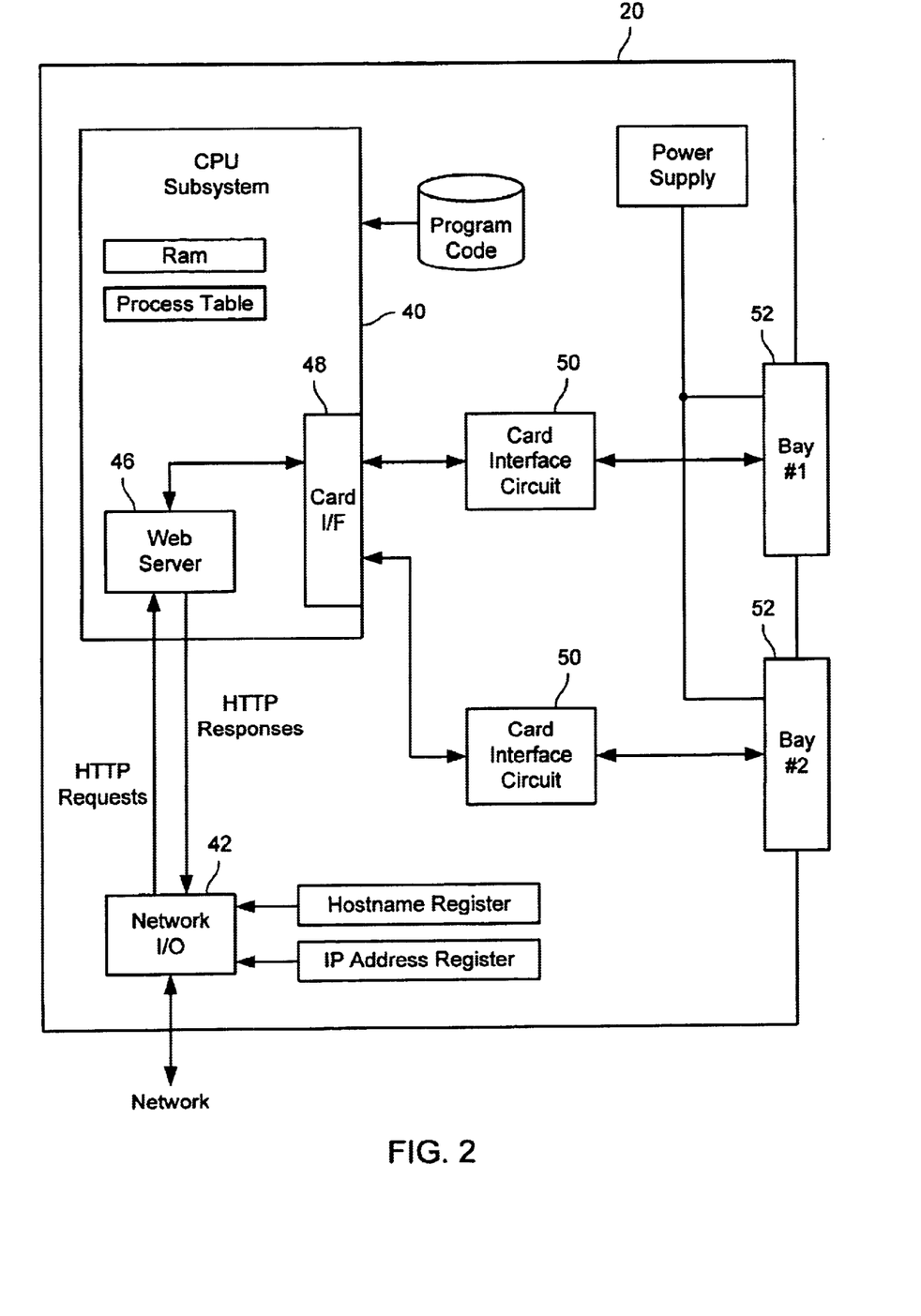
FIG. 2 is a block diagram of the components of an agency base unit.

An example of an agency unit 20 is shown in FIG. 2. That agency unit communicates with a network, such as network 14 (not shown), using network I/O 42. More specifically, a processing (CPU) subsystem 40 runs a number of processes including a web server process 46 and a card interface process 48. Web server process 46 interfaces to network I/O 42 to accept HTTP (HyperText Transport Protocol) requests addressed to agency unit 20 from other objects coupled to the network and to transmit HTTP responses to those objects.

Card interface process 48 communicates with mounted agency cards using card interface circuit 50. When an agent card 22 is fully inserted into a bay 52 of agency unit 20, processing subsystem 40 sets up the agent card 22 so that its contents can be accessed (i.e., the agent card is "mounted"). The particular HTTP response given by web server process 46 may depend on what agent cards are mounted in agency unit 20.

Figure 3:
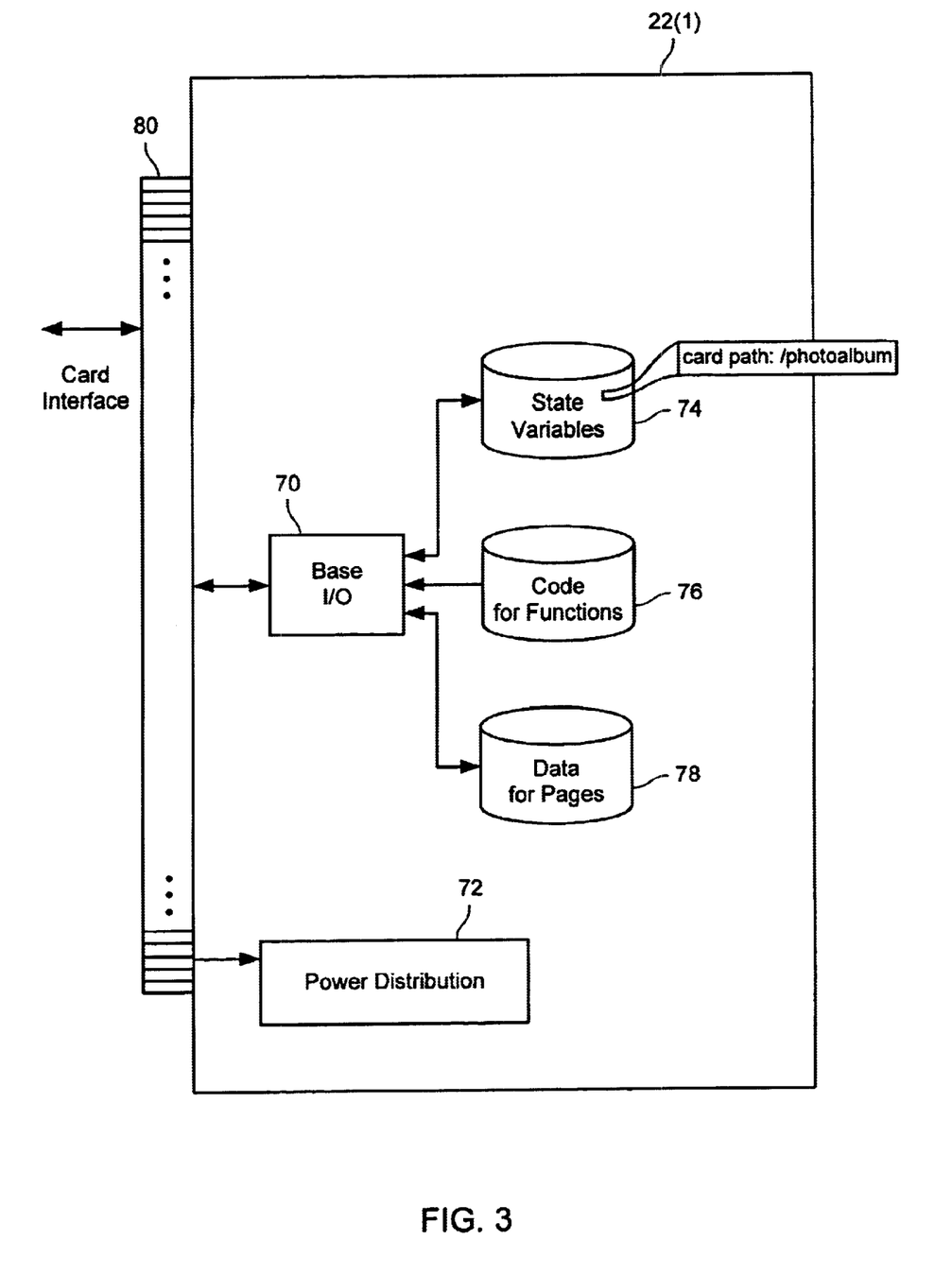
FIG. 3 is a block diagram of the components of a portable agent unit.

Referring now to FIG. 3, an agent card is there shown, comprising a base I/O 70 circuit for interfacing to the agency into which the agent card is mounted, a power distribution system 72, and storage for state variables 74, function code 76 and page storage 78. These three storage components interface to the agency unit via base I/O 70, which connects to the agency unit through a card interface 80. Card interface 80 might be a conventional interface, such as the PCMCIA interface, or an interface specific to the application. Other suitable interfaces in conventional systems include the USB and SCSI interfaces. The storage for state variables 74, function code 76 (tagsets) and page storage 78 (datasets) can be files in a conventional file structure or a non-traditional file system.

Figure 4:
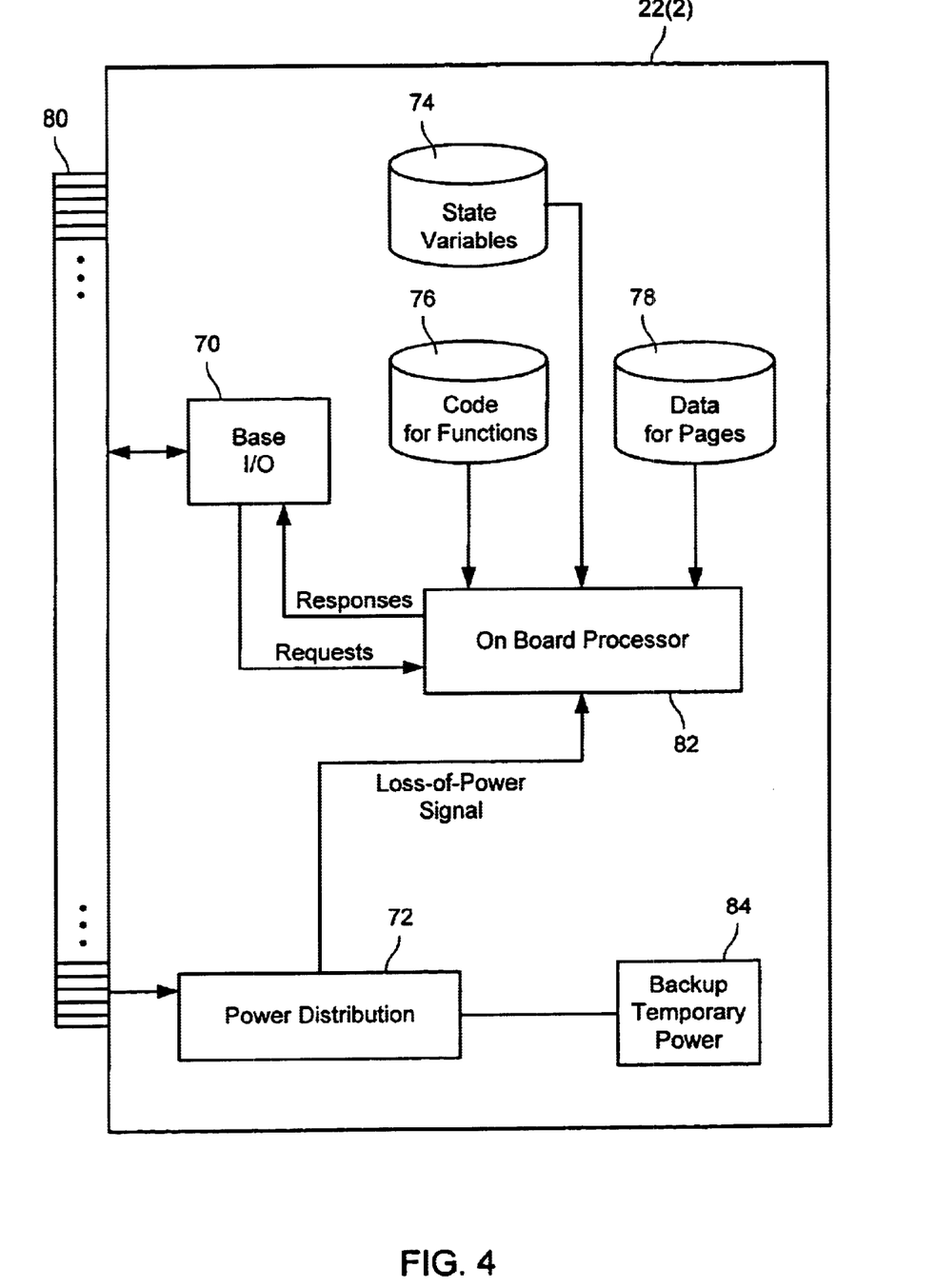
FIG. 4 is a block diagram of an alternative embodiment of a portable agent unit.

As shown, agent card 22(1) does not perform internal processing, but just makes its state, function code and page storage available to the hosting agency. In a different configuration, FIG. 4 is a block diagram of another agent card that includes internal processing. In that agent card, the three storage components interface to an on-board processor 82, which responds to requests from the hosting agency via base I/O 70. Additionally, power distribution 72 provides a signal to processor 82 to trigger shutdown processing upon loss of power. A backup power source 84 could be used to keep processor 82 and other components powered long enough to store the state of the agent card.

Referring back to FIG. 1, a typical set of operations of agency units 20 and agent cards 22 will now be described. The agency unit provides the primary functions of a Web server—it accepts request from clients and returns documents to them. Thus, the agency unit functions as an information agency. The agent cards plug into (are "mounted" into) the agency units, to provide a particular function or service. From the viewpoint of user computer 12, agent card functions are functions of the agency unit, since that is how those functions are accessed.

The agent cards maintain state for their functionality, but can be moved from agency unit to agency unit. Each agent card has a name and can be accessed from the home page of the agency unit once the agent card is mounted. In FIG. 1, there are two agency unit units, named "homebase" and "workbase" and two agent cards named "/photoalbum" and "/calendar". When the /photoalbum agent card is mounted on the workbase agency unit, the photo album agent's home page can be accessed at the URL: http://workbase/photoalbum/home.html and would be linked to from the workbase home page (http://workbase/home.html). The agent's functions might include code for adding captions, creating mosaics, or otherwise manipulating the images. Any changes to the images would be stored on the agent card, so that when the /photoalbum agent card was dismounted from the workbase agency unit and mounted on the homebase agency unit, the same images would be available (but now at the new URL: http://homebase/photoalbum/home.html).

The use of state-contained agent cards makes it much easier for an end user to transfer state from one location to another. Software for transferring state is known, but that requires installing a software application and then duplicating all of the configuration and data files. Other systems specify resources either as static files on a mounted disk, locally executable programs (CGI scripts), or compiled in software modules. Unlike those approaches, the agency unit/agent card approached described herein allows for specifying the access and processing mechanisms in the same package as the data. Note that a user does not need to have a data-specific application on their client in order to access and modify data on the agent card.

Agent cards with onboard processing power are the simplest to interface to, as they require no intelligence in the agency unit and agent cards without onboard processors are the least expensive, but require the base unit to be able to run the card's software. Typically, this will be in the form of some interpretable language such as Java bytecodes, PERL scripts, or InterForm XML.

When the agency unit notices a new agent card, the agency unit queries the agent card to determine the class of agent to be instantiated. The agency unit might also ask for a class definition. The agency unit then queries for a serialized version of an agent object, which gets instantiated in the agency unit as an object of the specified class. The agent object implements the agent's operations. The agency unit queries the object for the name of the agent and adds that name to a list of running agents. When the agency receives a request directed to the agent (using URL's as above) the agency first checks to make sure that the agent card is still mounted and then calls a particular method associated with that agent. The results are then sent back to the client.

If the agent card is removed while processing a request, an "internal server" error is returned to the user computer and no changes associated with that request are stored on the agent card. The agent object is responsible for maintaining a consistent, up-to-date version of itself on the agent card. The agency unit is responsible for synchronizing the transaction such that the user computer does not receive a response until the agent has updated its state. Note that the actual processing for handling a request may take place either in the agency unit or on the agent card depending on the implementation.

Agents are implemented in such a way that the data on the agent card will not become corrupted when the agent card is removed. Some of the possible ways of enforcing this are to provide a small amount of backup power to an on-board processor, typically in the form of a battery or capacitor, to allow the processor to complete the most recent transaction after the agent card has been dismounted. Alternatively, transaction-oriented data storage could be used on the card, using a two-stage commit process to ensure that an uncommitted transaction can always be rolled back.

Another way is using an "unmount" signal, sent to the agency unit and relayed to the agent card's agent telling the agent to save the agent card's state, prior to the agency unit unlocking or ejecting the agent card. The unmount signal might be generated by an "eject" button or by the opening of a door or cover over the agent card.

Figure 5:
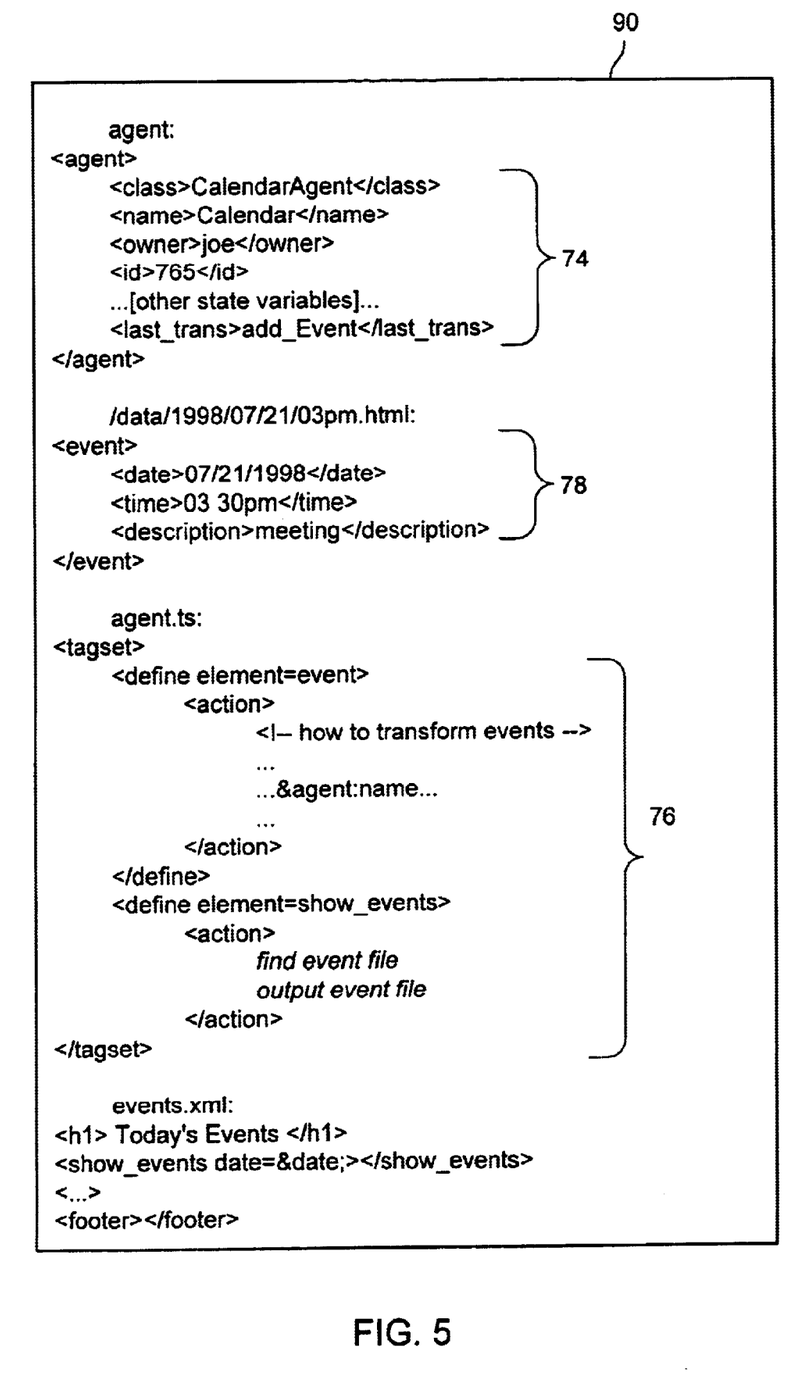
FIG. 5 is a listing of elements of an agent stored as part of a portable agent unit.

A specific example of a simple agent card and its contents is shown in FIG. 5. That agent card is used to provide a calendar function. In this first example, the agent card contains no processing capability of its own. When the agent card is inserted into an agency, the agency detects the card and looks for a file named "agent.xml". Since that file exists, it is found and the agency then reads the file to instantiate the calendar agent. That file, agent.xml, describes the class of the "agent" object to be instantiated and either points to a ".class" file on the agent card or specifies a generic agent class already known to the agency. The agent.xml file might alternatively point to a serialized version of the agent object. The agent.xml file also contains state variables, such as agent name, that get set appropriately on the agent object.

As part of the initialization of the calendar agent, the agency provides the object with the state of the agent, deriving the state from the state variables in the agent.xml file. Requests for reads or writes relating to the agent are directed to the agent card, so that the state is maintained, for the most part, on the card. Some recent state information might not have been written to the card, but when writing occurs, it does so in a way that keeps the card in a consistent state.

The agency instantiates the agent object. To do this, the agency reads agent.xml to determine the class of object to be instantiated. In the example shown in FIG. 5, agent.xml contains an entry for <class>, so an object of that class (CalendarAgent) is instantiated. If agent.xml had not specified the class, the agency would have just instantiated a generic agent, from a generic agent class maintained at the agency. Typically, if agent.xml has a <class> entry, it points to a file on the agent card.

In this case, the dataset contains calendar information. If the agent does not do any transformation of data, the tagset is not needed, but the typical agent will include a tagset that provides instructions on how data is transformed to create a response to a request. A tagset defines how elements are to be handled. An example of a tagset is shown in FIG. 5 as the "agent.ts" file.

When a request is received by the agency, the request is passed to the agent that is handling the request, as well as agents that are looking at the request and passing it on. For this to happen, the agent is registered with the agency. When the agent card is removed, the agent is deregistered with the agency.

When an agent handles a request, if it involves an active document, the active document (events.xml, or the like) and the tagset for the agent are passed to the agency's document processing system (DPS). References from the active document tagset map into the data provided to the DPS. The DPS generates a response, from the tagset and the active document, and sends the response to the client. In this example, events.xml is an active document in that it has a tagset with actions associated with tags.

Suppose an agency received an HTTP request of the form "<agency_host_name>/calendar/events" and the agency maintained a date variable indicating that the current date was Jul. 21, 1998. The agency notes, from its registration tables, that it has an agent with a name "calendar" that can handle requests directed to the partial URL "/calendar", but the agency does not need to know how to handle requests directed to the partial URL "/calendar/events". The request is passed to the agent for handling. In this case, since the agent card has no processing of its own, the agency hardware executes the code for the agent object. The agent looks in the agent's data space (the agent card) for a file called "events.xml" in response to the request. As shown in FIG. 5, this file is found on the agent card. The events.xml file is passed to the DPS along with the agent's tagset. The DPS tracks who passes the file and tagset and limits the use of the tagset to the context of the agent's data space. By passing tagsets, active documents are part of an agent.

By processing events.xml and agents.ts (the tagset), the DPS creates a document that includes event information for the current date. In the expansion of events.xml, "&date;" expands to the current date and show events expands to data stored in the data set for the agent. Once events.xml is expanded, it is sent as the HTTP response to the HTTP request. One advantage of the DPS approach is that an agent might include a tagset that codes for a malicious or poorly written program that could alter data owned by other agents. By using the DPS, the tagset is only operated on in the context of the agent, so the tagset is only used to evaluate the data of the agent.

By registering with an agency, an agent effectively "listens in" on the request traffic flowing through the agency and handles requests directed to that agent. For an agent card with active processing, the agent might be instantiated or already exist on the agent card. For an agent card without active processing, the agent is instantiated upon registration. When an agent card is removed, the agent is deregistered.

If an agent card is removed from one agency and connected to another agency, the agent can continue with the new agency performing the operations it performed with the prior agency, since the state of the agent is stored with the agent. One way to store the state information is to store it on the agent card, such as in the agent.xml file that is part of agent data 90 illustrated in FIG. 5, and using a commit/rollback process to keep the agent in well-defined states. When a new agent is introduced to an agency, that new agent is registered with the agency and the registration process includes instantiation of the agent object and inserting the agent object into a processing stream (the document stream). In effect, the registration of the agent modifies the operation of a running program (the agency) so that the running program can handle events that it did not handle prior to the registration.

Where the agent card includes processing, the agent object might not need to be instantiated, but might instead be already running on the agent card. In that case, the agent object is not instantiated, but the agent is registered so that messages for that agent are routed to the agent card. Whether the agent is instantiated on the card or in the agency, all the agents are part of the agency's execution space and the communication between processes is via the document stream. In a specific embodiment, the document stream is an HTTP document stream and agents process HTTP documents.

Figure 6:
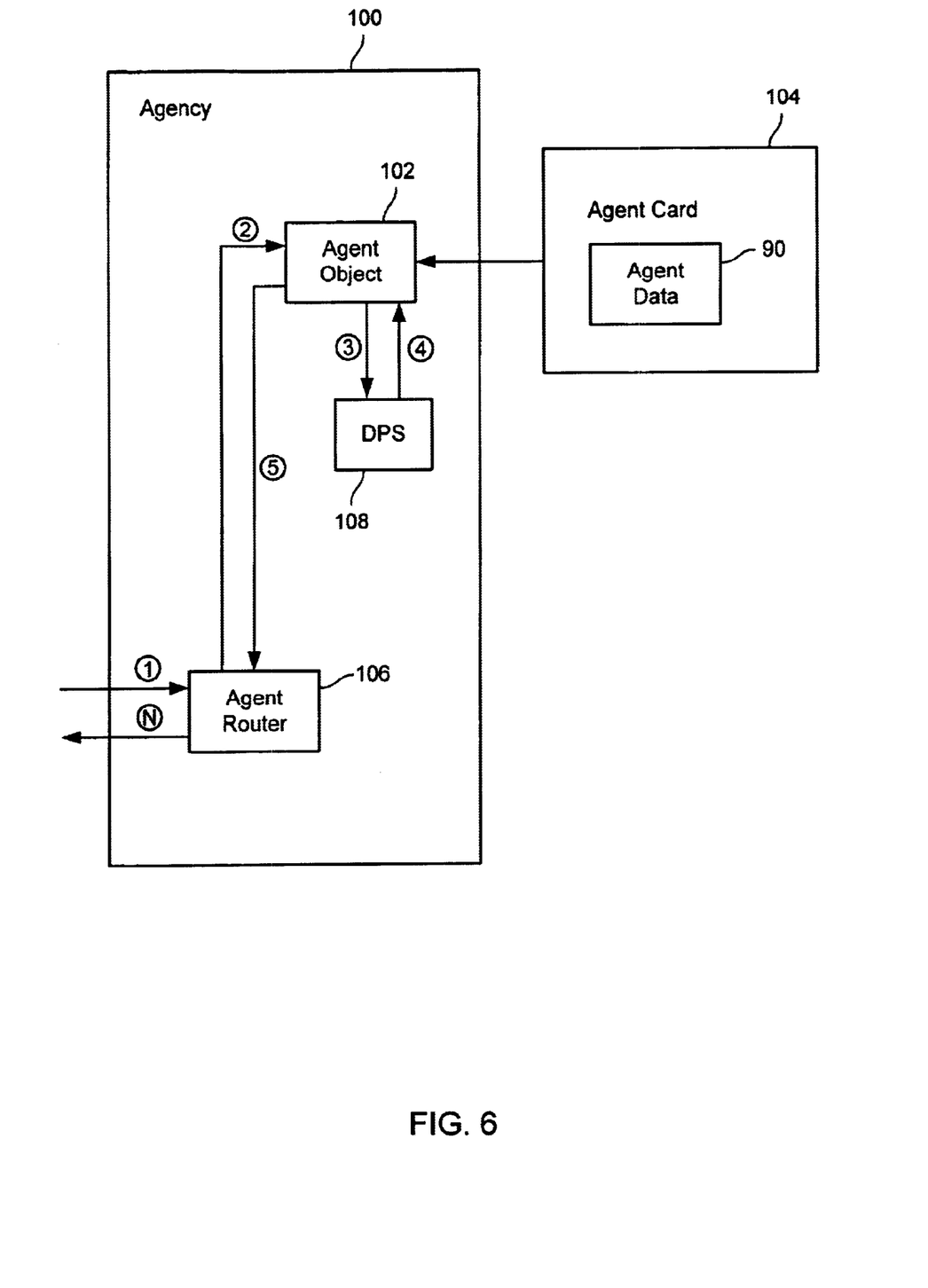
FIG. 6 is a logical block diagram showing the agent of FIG. 5 instantiated and registered with an agency.

FIG. 6 is a logical block diagram showing the agent of FIG. 5 instantiated and registered with an agency. As shown in FIG. 6, an agency 100 instantiates an agent object from an agent card 104. In this example, the agent card contains the agent data 90 shown in FIG. 5. Agency 100 is also shown including an agent router 106 and a DPS 108. The steps of one message processing sequence are labeled with circled numbers. In step 1, agency 100 receives a message in the form of an HTTP request. In the example described above, "/calendar/events" is such a request. In step 2, agent router 106 determines that agent object 102 is the object that will be handling the request and routes the HTTP request (which is itself an HTTP "document") to agent object 102. Agent object 102 uses its tagset and its state information, as needed, to process the request. The tagset and an XML file or an HTTP file might be sent to DPS 108 for processing (step 3) with the processed document being returned to agent object 102 (step 4). Agent object 102 then routes the document to agent router 106 (step 5) that in turn provides the response to the request (step N). That step is labeled "step N" because other steps might have occurred prior to the response, such as the processing of the results by another agent.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of processing information as documents on a network, wherein a client request is a document and a response from an agency server to the client request is also a document, the method comprising the steps of:

addressing the client request to the agency server;

coupling an agent card to the agency server, wherein the agent card includes storage for response functionality and state variables including a state of an agent object that would be an instantiation of the response functionality, and wherein the agent card is portable among agency servers;

following the coupling of the agent card to the agency server, instantiating the agent object with a state derived from the state variables; and when a document is received at the agency server and is to be acted upon by the agent object, passing at least a reference of the document to the agent object.

2. The method of claim 1, wherein the step of instantiating an agent object is a step of either instantiating the agent object on the agency server or instantiating the agent object on the agent card.

3. A networked information appliance for use on a network, comprising:

a plurality of agency base units, wherein each agency base unit is configured on the network with an address; and a plurality of agent-cards, wherein each agent card includes storage for at least one response functionality and storage for state for the at least one response functionality that is provided to a user of the network at an address dependent on the address of the agency base unit into which the agent card is mounted, wherein a response functionality implements one or more functions of responding to document requests and wherein the state included on each agent card is a state of the response functionality.

4. The networked information appliance of claim 3, wherein the plurality of agency base units are coupled to an agency device and the agency device is an HTTP server.

5. The networked information appliance of claim 3, wherein state of an agent card is stored as an XML file in a file system on the agent card.

6. The networked information appliance of claim 3, wherein transformations of documents as described by a tagset are stored as a tagset file in a file system on the agent card.

7. The networked information appliance of claim 3, wherein each agent card includes program instructions for applying transforms specified in a tagset to a document.

8. The networked information appliance of claim 3, wherein the agent cards include state, tagsets and data in a static file structure.

9. The networked information appliance of claim 3, wherein the agent cards include state, tagsets and data in a file structure and on-card processing for processing messages received from an agency through a message passing interface.

10. The networked information appliance of claim 3, wherein the agency includes processing logic and means for signaling an ejection request, wherein the processing logic causes a state of an agent card to be written to the agent card prior to the agent card being removed from the agency unit.

11. A networked information appliance for use on a network, comprising:

a plurality of agency base units, wherein each agency base unit is configured on the network with an address and is coupled to an HTTP server; and a plurality of agent cards, wherein each agent card includes storage for state, stored as an XML file in an agent card file system, for at least one response functionality that is provided to a user of the network at an address dependent on the address of the agency base unit into which the agent card is mounted, wherein a response functionality implements one or more functions of responding to document requests and wherein the state included on each agent card is a state of the response functionality.

* * * * *